United States Patent

[11] 3,617,414

| [72] | Inventor | Ludwig Wesch<br>Heidelberg, Germany |
|---|---|---|
| [21] | Appl. No. | 571,293 |
| [22] | Filed | Aug. 9, 1966 |
| [45] | Patented | Nov. 2, 1971 |
| [73] | Assignee | Mancar-Trust<br>Vaduz, Liechtenstein |
| [32] | Priority | Aug. 10, 1965 |
| [33] | | Germany |
| [31] | | W 39 707 |

[54] PROCESS AND APPARATUS FOR THE MANUFACTURE OF FIBER GLASS REINFORCED PLASTIC TUBES AND SIMILAR BODIES ACCORDING TO THE FILAMENT WINDING PROCESS
4 Claims, 4 Drawing Figs.

[52] U.S. Cl.................................................. 156/169,
156/172, 156/173, 156/175, 156/180, 156/425, 156/428, 156/429, 156/431, 118/117
[51] Int. Cl....................................................... B31c 13/00, B65h 81/08
[50] Field of Search........................................... 156/175, 429, 430, 173, 425, 428, 429, 431, 180, 169; 118/115, 116, 117, 114, 100, 211

[56] References Cited
UNITED STATES PATENTS
| 1,980,961 | 11/1934 | Sommer........................ | 118/117 X |
| 2,217,337 | 10/1940 | Ewaldson et al.............. | 118/117 |
| 2,749,266 | 6/1956 | Eldred........................... | 156/173 X |
| 3,112,234 | 11/1963 | Krupp............................ | 156/180 X |
| 3,366,522 | 1/1968 | Underwood.................... | 156/175 X |

FOREIGN PATENTS
| 238,021 | 9/1959 | Australia....................... | 156/173 |
| 795,924 | 6/1958 | Great Britain................ | 156/175 |

*Primary Examiner*—John T. Goolkasian
*Assistant Examiner*—D. J. Fritsch
*Attorney*—Arthur O. Klein ABSTRACT: A process and apparatus for manufacturing tubes from coils of fiber glass which have been impregnated in a suitable resin. The fiber glass initially is in the form of roving strands which are guided through a suitable impregnating bath. Suitable combs guide the rovings between pressure rollers which have a configuration imparting to the rovings a flat band shape, giving the rovings a rectangular cross section. Not only are the rovings thus provided with a rectangular cross section and a flat tapelike configuration, but in addition the pressure rollers serve to maintain the rovings at a distance from each other which is substantially less than their width, the distance between the flat rovings being much less than one-half of their width and in some cases as small as one-tenth their width. In this condition the rovings are angularly fed onto a rotary mandrel on which the coils are formed so as to provide the desired tube. Because of the small distance between the flat rovings an exceedingly strong tube with a high burst strength is achieved.

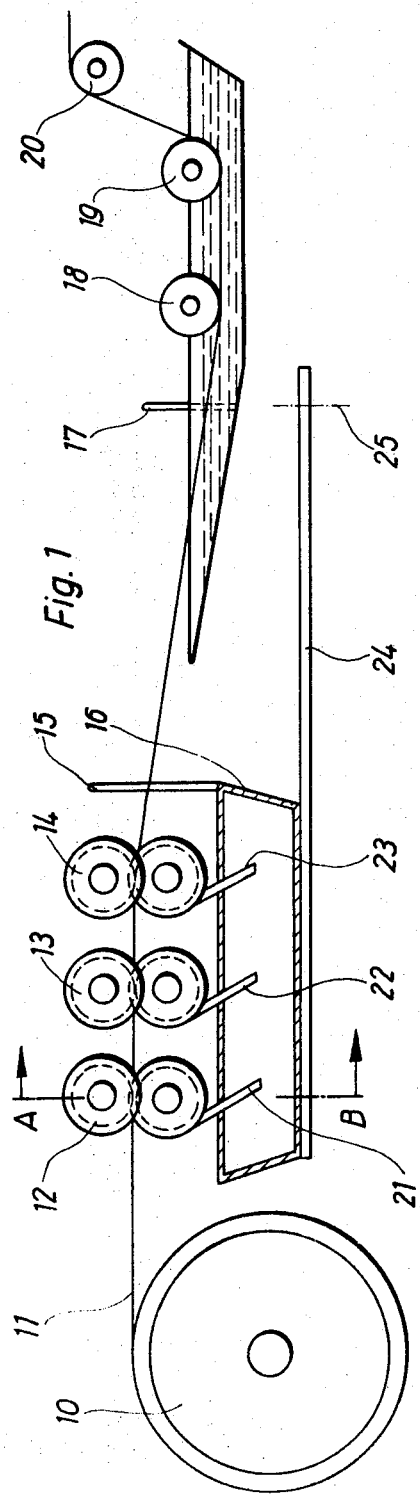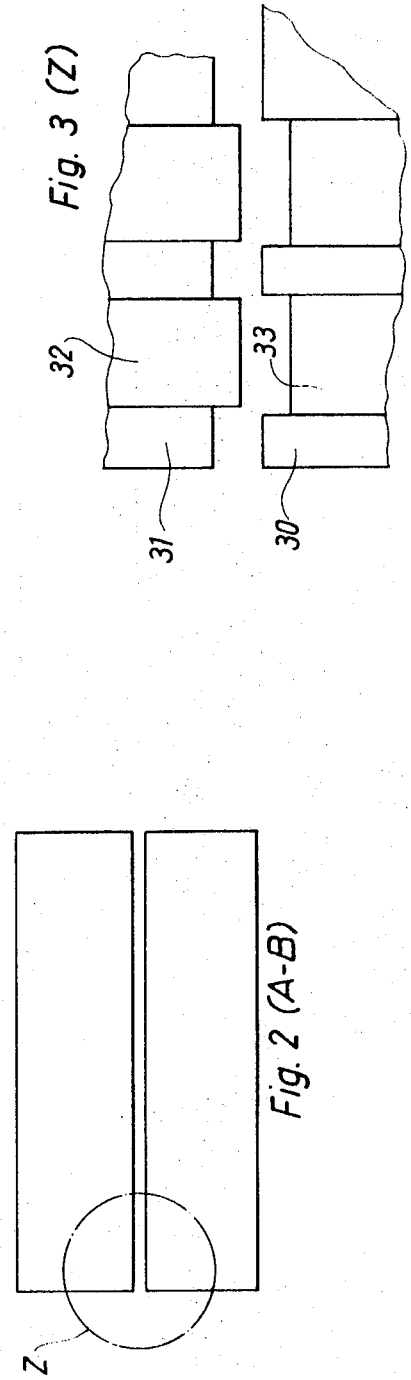

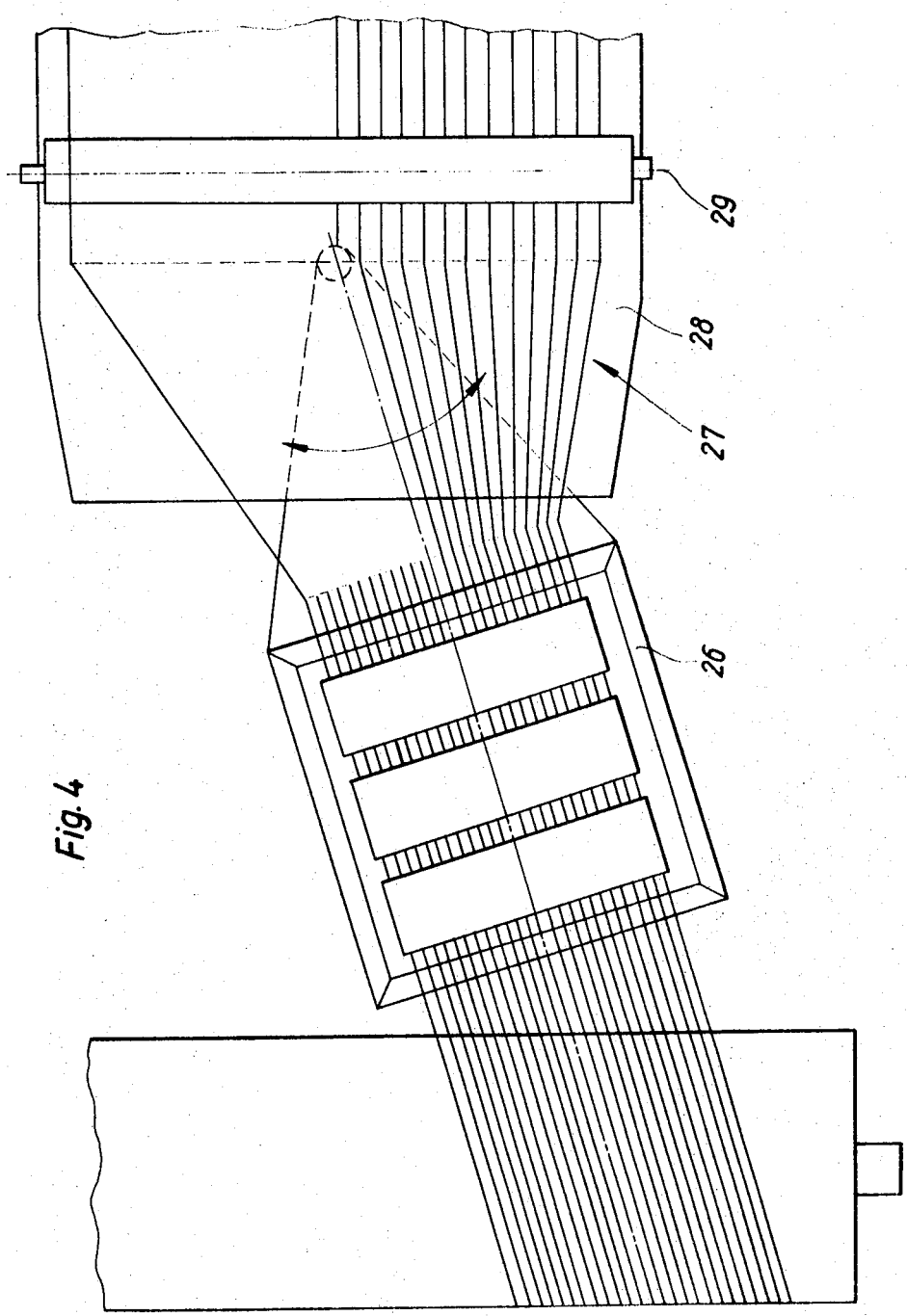

PROCESS AND APPARATUS FOR THE MANUFACTURE OF FIBER GLASS REINFORCED PLASTIC TUBES AND SIMILAR BODIES ACCORDING TO THE FILAMENT WINDING PROCESS

This invention relates to the process and apparatus for manufacturing fiber glass reinforced tubes and similarly shaped bodies.

It is already known in the art to manufacture fiber glass reinforced tubes by spooling fiber glass threads onto a rotatably mounted cylinder drum, wherein the fiber glass thread feeding arrangement includes a carriage which supports one or more pairs of roving rollers and one or more impregnating tanks. The spool angle of this arrangement is determined by the speed of rotation of the cylinder drum and the translation velocity of the carriage. In principle, this arrangement effectuates the spooling of the impregnated roving strands in a crisscross pattern, the spool angle depending on the mechanical values to be attained and on the type of body to be manufactured.

In the aforedescribed known arrangement generally each one of the strands or a plurality of strands are being guided through a comb, in order to obtain a uniform distancing between the strands. The roving strands which are being pulled under tension through the comb are being simultaneously abruptly bent at the comb exit points in accordance with the spool angle, which causes frictional forces to act on the strands, thereby sometimes splitting them. It has also been noted that when roving strands are used, which are formed with a plurality of threads (usually in excess of ten), these strands retain a round or slightly edgewise shape after having been pooled onto a cylinder so that at the crossover points of the angularly spooled strand there are formed very thick knotty points. These knotty points and, in particular, the hollow spaces formed therebetween, cause a considerable weakening of the whole structure, and a weakening to a marked degree when the tube is placed under pressure. Furthermore, in the aforedescribed, not carefully prepared rovings, air pockets frequently form, which can not be removed later on. This causes a considerable further weakening of the structure and, in the event the dielectric property of the tubes are used, the air pockets can cause an electrical breakdown.

It is an object of this invention to provide a process and apparatus for manufacturing fiber glass reinforced plastic tubes which overcome substantially all of the aforedescribed disadvantages.

An illustrative embodiment of a machine constructed in accordance with this invention together with additional objects and advantages thereof, will be best understood from the following description of specific embodiments when read in connection with the accompanying drawings in which:

FIG. 1 is an elevation illustrating schematically the apparatus forming part of this invention;

FIG. 2 is a cross-sectional view along line A-B of FIG. 1; and

FIG. 3 is a detailed schematic view of the area enclosed by a circle in FIG. 2.

FIG. 4 is a plan view of the apparatus illustrated in FIG. 1;

Referring now specifically to the drawing, the apparatus of the invention is described first. There is illustrated a rotatably mounted cylinder drum 10, the speed of rotation of which can be adjusted continuously by well known adjusting means (not illustrated). The roving strand 11, which is to be spooled onto the cylinder 10, is guided over a guide roller 20 into an impregnating bath in a tank 28, where the strand 11 is guided under a pair of guide rollers 18 and 19. In the event a plurality of roving strands 11 are being spooled simultaneously, they are guided through a comb arrangement 17, which can be either mounted inside the tank for the impregnating bath (as illustrated) or outside said tank (not illustrated). The roving strands 11 are then guided through a second comb arrangement 15 and through three pairs of adjacently mounted pressure rollers 12, 13, 14 which deform the roving strands from their original round shape into a preselected shape which is preferably very flat. The distance between the comb teeth of the comb arrangement 15 and the distance between the projections of the roller pairs 12, 13, 14 (FIG. 4) are smaller than the distance between the comb teeth of the comb arrangement 17. The detailed shapes of the surfaces of the roller pairs 12, 13, 14 are illustrated in FIG. 3. Thus, the projections 30 and grooves 31 mesh with each other a predetermined extent, and also determine the distance between the roving strands which are guided through the roller pairs 12, 13, 14, between the projections 32 and grooves 33 which also mesh with each other a predetermined extent. Thus, the individual roving strands 11 are pressed into a broad flat shape in accordance with the preadjusted distance between the roller pairs 12, 13, 14, and the corresponding sizes of the openings between the projections 32 and grooves 33. Below each one of the lower rollers of the roller pairs 12, 13, 14 there is mounted a scraping arrangement 21, 22, 23 which wipes off the excess resin which then flows into a second tank 16. In this manner, a uniform impregnating of the roving 11 with the casting resin is achieved. In contradistinction thereto in the known devices of the prior art the excess resin is removed only at the cylinder and, consequently, the roving strands are not so uniformly impregnated. In the device of this invention, due to the fact that the resin is removed before the roving strands 11 are being spooled onto the cylinder 10, the air bubbles are removed from the resin by being pressed out by the pressure roller pairs 12, 13, 14.

It is essential that the shape of the roving strands 11 remains substantially unchanged when being spooled onto the drum cylinder 10. This can only be accomplished if the pressure roller pairs 12, 13, 14 are mounted so as to form a joint installation with the second tank 16. For this purpose, the tank 16 is mounted on a supporting plate 24, which is in turn pivotably mounted about a pivot support 25 adjacent to the first tank 28. The impregnating rollers 18 and 19 are advantageously rotatably mounted in the vertical walls 29 of the tank 28, whereas the pressure roller pairs 12, 13, 14 are mounted by means of a special suspension system (not illustrated in detail) in the vertical walls 26 of the second tank 16. The angular movement of the tank 16 can be adjusted completely automatically or the tank 16 is automatically entrained (due to the joint installation of pressure roller pairs 12, 13, 14, and the tank 16) by the transverse movement of the roving support arrangement. This transverse angular movement of the tank 16 and the pressure rollers 12, 13, 14 can be attained by well-known electromagnetic and/or electric motor means.

It is possible with the apparatus of this invention to spool the roving strands in juxtaposed position, whereby the hollow spaces between the individual roving strands is reduced to a minimum. Thus the distance between the individual roving strands is solely determined by the distance between the grooves 33 of the pressure roller pairs 12, 13, 14. This distance should preferably not exceed one half the width of the individual flat-pressed strands. In the event a very tight tube structure is to be produced, the aforementioned distance should be reduced to about one tenth of the width of an individual roving strand.

By using one or more pressure roller pairs, it is also possible to simultaneously regulate the tension pull for the roving strands, whereby the pressure roller pairs are provided with an automatically controlled gearing mechanism (not illustrated) for automatically adjusting the tension pull for the roving strands.

Whereas with the prior art processes of the filament-winding technique the distances between the individually spooled roving strands was equal to about one roving width (diameter of the roving strand), which caused the tubes manufactured by these prior art processes to have a relatively low bursting strength, a considerably higher bursting strength is obtained for corresponding tubes manufactured by the process of this invention, in which the roving strands are much more closely spaced together and are impregnated with a controlled, airfree resin. Furthermore, the tubes manufactured by the process of this invention have a higher dielectric strength (electric breakdown) when being subjected to a source of electric power. Lastly, since the wall structure is inherently stronger, the tubes can be made with thinner walls with the process of this invention.

The fiber glass content of a tube manufactured in accordance with the process of this invention can be adjusted to an optimum percentage and thus fiber glass percentages can be attained which normally are only present in flat fiber glass plates manufactured out of roving webs with a pressure process.

In the event the interior surfaces of the tubes are to be coated with an elastomeric material or a coating of another suitable material, the coating process can be accomplished much more easily and simply than with tubes manufactured with the prior art processes. Furthermore, the tube or similarly shaped bodies manufactured with a process according to this invention have greater wear resistance when in continuous use and, when subjected to dynamic loads, have a greater resistance to mechanical failures than the tubes manufactured with nonpreshaped roving strands being spooled with larger distances between the individual strands.

It should further be noted that with the process of this invention up to 100 roving strands can be spooled simultaneously. Furthermore, the number of individual threads forming each strand can be augmented to 60 and even more, so that with the better grade strands, the speed of the manufacturing process can also be considerably increased.

Although the present invention has been described in conjunction with one preferred embodiment, it is to be understood that modifications and variations may be resorted to without departing from the spirit and the scope of the invention, as those skilled in the art will readily understand.

What I claim is:

1. A process for the manufacture of fiber glass reinforced plastic tubes or similarly shaped bodies with roving strands, comprising the steps of passing a plurality of roving strands through an impregnating resin bath, thereafter passing said strands between at least one pair of pressure rollers which preshape said strands into the shape of flat bands of rectangular cross section, thereafter spooling said flat band shaped roving strands onto a rotating cylinder drum while the strand is being moved transversely along the cylinder drum periphery, said pressure rollers being pivotally mounted on a carriage and assuming a predetermined angular position with respect to said rotating cylinder drum thereby forming juxtaposed loops of strand around said drum cylinder, and maintaining the distance between adjacent strands on said drum cylinder smaller than the diameter of said strands before having been preshaped, wherein said pair of pressure rollers are pivotally mounted, and oscillating said rollers in a plane substantially parallel to said cylinder drum, the angle between the axes of the pair of pressure rollers and the axis of said cylinder drum being substantially equal to the spool angle of said plurality of roving strands on said cylinder drum, and decreasing the distances between the plurality of juxtaposed roving strands after having been passed through said impregnating bath and before being passed between said pair of pressure rollers.

2. In an apparatus for the manufacture of fiber glass reinforced plastic tubes or similarly shaped bodies with roving strands, an improved installation, comprising in combination, guide roller means operatively mounted in said apparatus, a tank adapted to hold a resin impregnating bath, said guide roller means being adapted to guide roving strands through said impregnating bath for the purpose of impregnating them, support means pivotably mounted for a reciprocal angular movement in a predetermined plane in said apparatus, pressure roller means rotatably mounted in said support means, said roving strands being adapted to be guided between said pressure roller means, thereby being shaped by said pressure roller means into an essentially flat band shape, and a cylinder drum rotatably mounted in said apparatus in a plane substantially parallel to said predetermined plane in which said reciprocal angular movement of said support means occurs, said cylinder drum being adapted to spool said flat band shaped roving strands onto its cylindrical periphery, said pressure roller means including at least one pair of coacting pressure rollers respectively formed with circumferential grooves and ribs therebetween of rectangular cross section with the ribs of one of said pressure rollers meshing with the grooves of the other of the pressure rollers, and said pressure rollers having roving flattening coacting ribs and grooves of relatively great width and separating coacting ribs and grooves of much smaller width situated between the ribs and grooves of great width, so that the roving strands flattened between said pressure rollers are spaced from each other by a distance substantially less than their width.

3. In an apparatus for the manufacture of fiber glass reinforced plastic tubes or similarly shaped bodies with roving strands, the improved installation as set forth in claim 2, including first comb means mounted in said apparatus adjacent said guide roller means, and second comb means mounted in said apparatus adjacent to said pressure roller means, said first and second comb means having respectively a plurality of teeth projecting therefrom and said roving strands being adapted to be guided respectively between said plurality of teeth of said first and second comb means, the distance between said plurality of teeth of said first comb means being larger than the distance between said plurality of teeth of said second comb means.

4. In an apparatus for the manufacture of fiber glass reinforced plastic tubes or similarly shaped bodies with roving strands, the improved installation as set forth in claim 2, including scraper means operatively connected to said pair of pressure rollers and adapted to scrape excess resin from said roving strands passing between said pair of pressure rollers, and a second tank mounted on said support means below said pair of pressure rollers and adapted to receive said excess resin from said scraper means.

* * * * *